US00RE38436E

(19) United States
(12) Reissued Patent
Su

(10) Patent Number: US RE38,436 E
(45) Date of Reissued Patent: Feb. 24, 2004

(54) PUSH CART

(76) Inventor: Chung-Shiu Su, No. 3, Lane 565, DaHseh Rd., Lu-Chu Shiangi, Kaohsiung Hsien, 821 (TW)

(21) Appl. No.: 10/071,827

(22) Filed: Feb. 11, 2002

Related U.S. Patent Documents

Reissue of:
(64) Patent No.: 6,053,514
Issued: Apr. 25, 2000
Appl. No.: 09/141,413
Filed: Aug. 27, 1998

(51) Int. Cl.[7] ..... B62B 1/20
(52) U.S. Cl. ..... 280/40; 280/47.315
(58) Field of Search ..... 280/638, 35, 38, 280/39, 40, 641, 645, 646, 651, 652, 654, 655.1, 47.17, 47.18, 47.24, 47.27, 47.29, 47.315, 42, 63, 655

(56) References Cited

U.S. PATENT DOCUMENTS

| | | | | |
|---|---|---|---|---|
| 3,043,603 A | | 7/1962 | Major, Sr. | |
| 3,659,867 A | * | 5/1972 | Curry | 280/40 |
| 4,315,632 A | * | 2/1982 | Taylor | 280/40 |
| 4,659,096 A | * | 4/1987 | Leimgruber | 280/39 |
| 4,754,985 A | * | 7/1988 | Im et al. | 280/40 |
| 4,917,392 A | * | 4/1990 | Ambasz | 280/40 |
| 4,993,727 A | | 2/1991 | vom Braucke et al. | |
| 5,127,662 A | * | 7/1992 | Spak | 280/40 |
| 5,312,006 A | * | 5/1994 | Lag | 211/195 |
| 5,348,325 A | * | 9/1994 | Abrams | 280/40 |
| 5,439,239 A | * | 8/1995 | Su | 280/40 |
| 5,468,005 A | * | 11/1995 | Yang | 280/40 |
| 5,803,471 A | * | 9/1998 | DeMars et al. | 280/40 |
| 5,984,327 A | * | 11/1999 | Hsieh et al. | 280/47.24 |
| 6,425,599 B1 | * | 7/2002 | Tsai | 280/652 |

FOREIGN PATENT DOCUMENTS

| | | | |
|---|---|---|---|
| CH | 217650 | | 10/1941 |
| CN | ZL98246528.9 | | 11/1998 |
| DE | 1943253 | | 7/1966 |
| DE | 1982824 | | 4/1968 |
| DE | 29714225 | U1 | 11/1997 |
| DE | 29807428 | U1 | 9/1998 |
| EP | 0352515 | B1 | 1/1990 |
| EP | 0352515 | A2 | 2/1993 |
| GB | 1406272 | * | 9/1975 |

OTHER PUBLICATIONS

Decision 4 O 460/99 of the District Court of Dusseldorf in Germany (defendant was found infringing Braucke's patent EP0352515 by coping a model shown in DE29714225U1).

* cited by examiner

*Primary Examiner*—Brian L. Johnson
*Assistant Examiner*—Bryan Fischmann

(57) ABSTRACT

A push cart [comprises] *includes* a main frame, a handle, a front support, two wheel frames, two wheels, *and* a retractable rod [and a rear support], wherein the main frame has a pair of side rods connected with a pair of rods of the handle in a slidable manner, [the center portion of the main frame is connected to each other,] and the lower portion of the main frame [has] *is* connected with [a] *the* wheel [frame] *frames* and [a wheel respectively] *the wheels*. The lower [respective ends] *portion* of the main frame [are] *is* connected with respective [ends] *sides* of the front support which then meshes with the wheel [frame] *frames*. The respective lower ends of the handle are connected with one end of the retractable rod whereas the other end of the retractable rod is connected with the inner center portion of the front [support, thus,] *support. Thus,* by operating the handle, the retractable rod is linked to move [which then links] the front support and the wheel frame to retract or to expand.

29 Claims, 9 Drawing Sheets

PUSH CART

Matter enclosed in heavy brackets [ ] appears in the original patent but forms no part of this reissue specification; matter printed in italics indicates the additions made by reissue.

FIELD OF THE INVENTION

This invention relates to a push cart, and more particularly, to a cart which can be operated by the handle to retract or to expand a front support and [a] *at least one* wheel frame.

BACKGROUND OF THE INVENTION

In order to produce a [compact easy to carry] *compact, easy-to-carry* push cart, various *prior art* carts [are] *were* made in compact size[,] by folding each parts of a [cart,] *cart;* however, such design still possesses many defects. Later, a compact push cart was developed which comprises a handle that is foldable against the supporting rod and to link wheels to collapse inwardly or to expand [inwardly,] *inwardly;* however, the [support will still be needed to operate manually] *retraction of different parts are operated separately*.

OBJECT OF THE INVENTION

[This] *It* is the primary object of the present invention to provide a push cart which is easy to operate.

It is another object of the present invention to provide a push cart which structure is more solid and more compact.

It is a further object of the present invention to provide a push cart which is less expensive to produce.

BRIEF DESCRIPTION OF THE DRAWINGS

*The foregoing and additional features and characteristics of the present invention will become more apparent from the following detailed description considered with reference to the accompanying drawings, in which like reference numerals designate like elements and wherein:*

DETAILED DESCRIPTION OF THE PREFERRED EMBODIMENT

Figure 1:
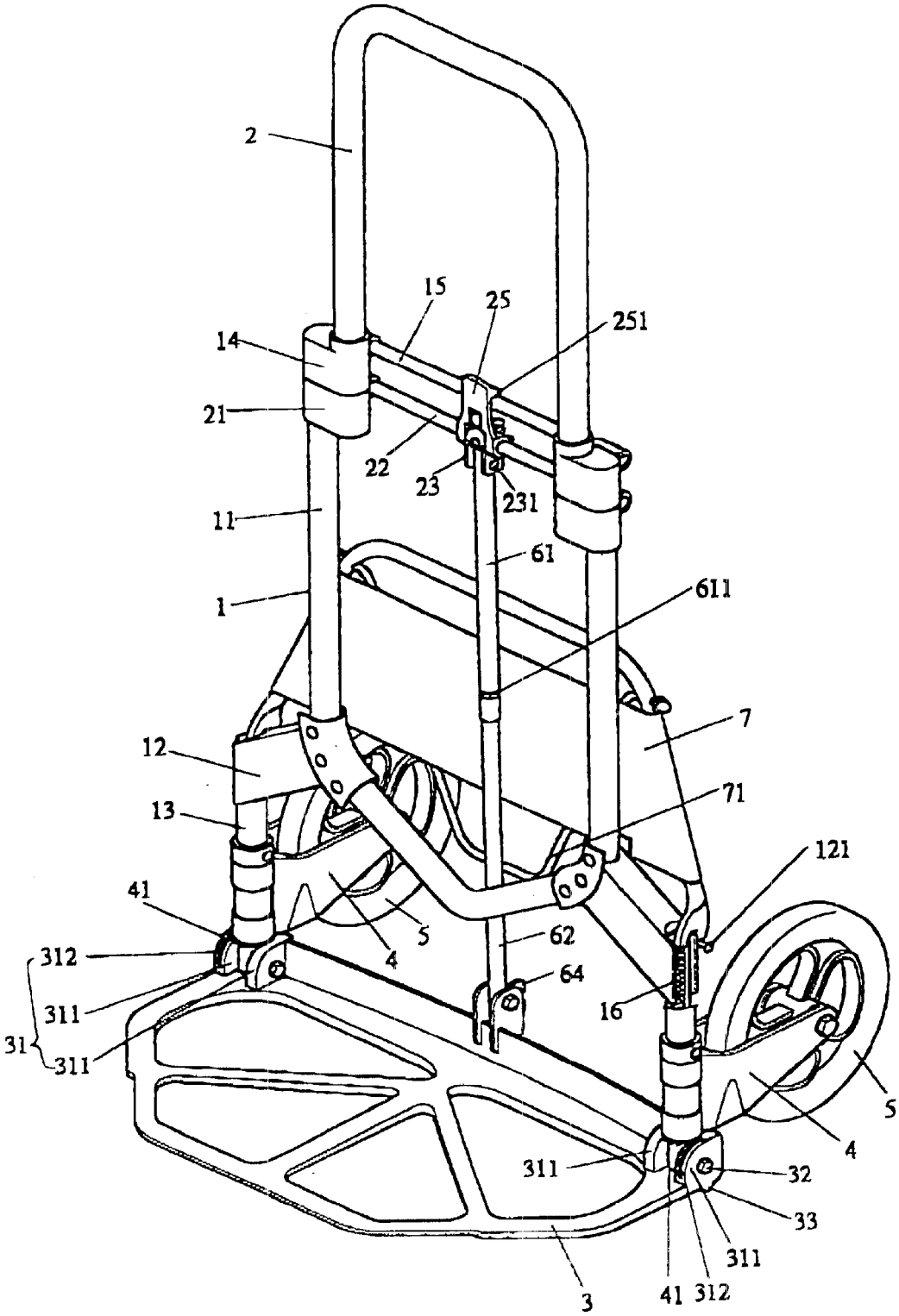
FIG. 1 is a perspective view of the present invention.

Referring to FIG. 1, a push cart of the present invention comprises a main frame 1, a handle 2, a front support 3, two wheel frames 4, two wheels 5, a retractable rod 6 and a rear support 7. The interconnected relations are such that, the main frame 1 has its upper respective sides slidably connected with the lower respective sides of the handle 2, the middle portion of the main frame 1 is connected with the respective sides of the rear support 7 while the lower portion of the main frame 1 is connected to the wheel frame 4 which then connected with a pair of wheels 5. The respective lowermost ends of the main frame 1 are connected with the respective ends of the front support 3 which then meshes with the wheel frame 4. The center portion of the handle 2 is connected with one end of the retractable rod 6 which has its other end connected to the inner center portion of the front support 3. By operating the handle 2, the retractable rod 6 is linked to retract or to expand the front support 3 and the wheel frame 4.

The main frame 1 comprises a U-shaped rod 11, two fixtures 12, two supporting rods 13, two sockets 14, a cross bar 15 and a pulling spring 16. The lower ends of the U-shaped rod 11 are connected with one end of each fixture 12, the other ends of the fixtures 12 are secured with the supporting rods 13, respectively. Each supporting rods 13 has a pulling *sp*ring 16 which connects to a pin 121, the U-shaped rod 11 has a pair of sockets 14 being connected to a cross bar 15 at its respective ends.

Figure 2:
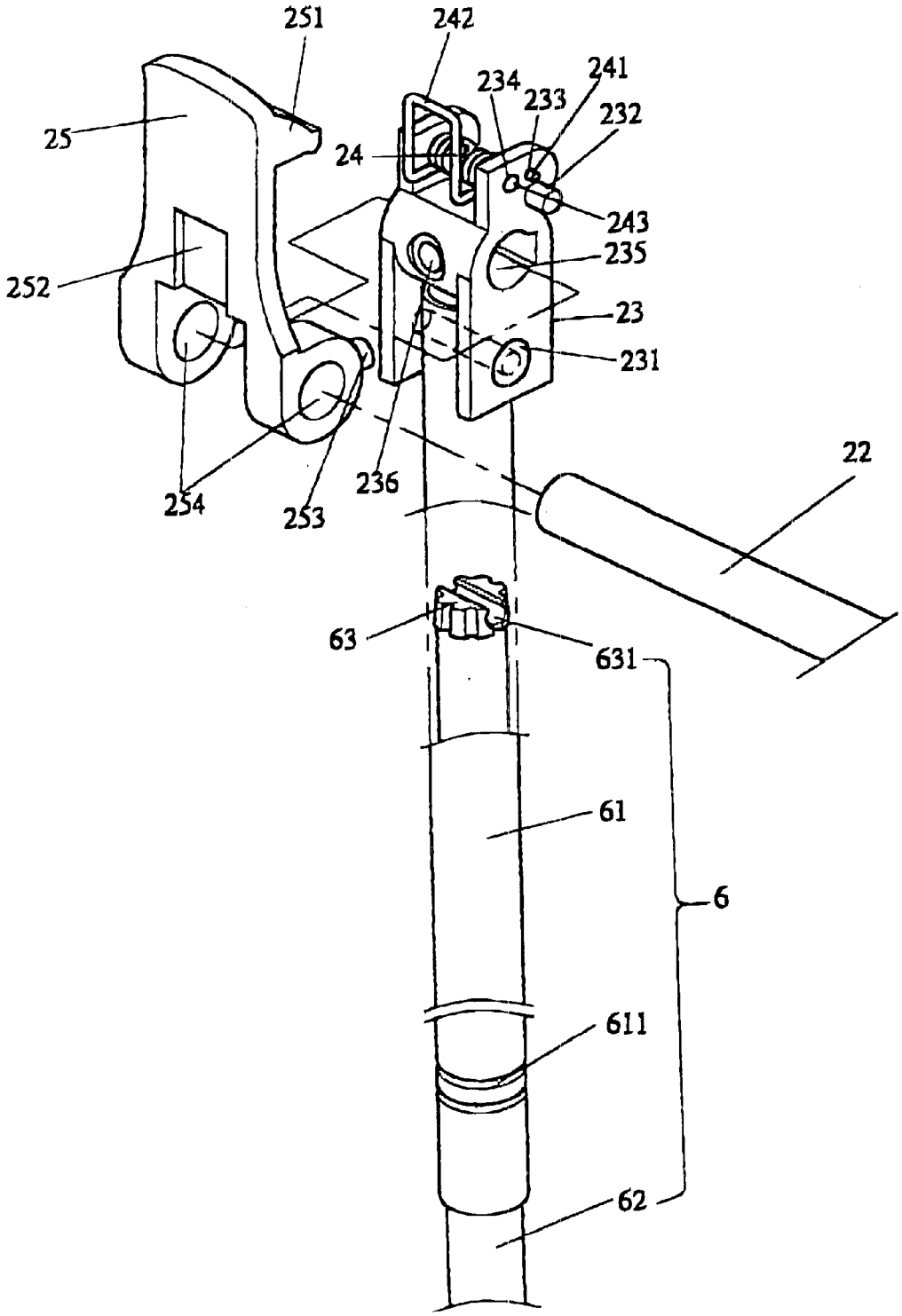
FIG. 2 is an enlarged view of a snap plate of the present invention.
Figure 3:
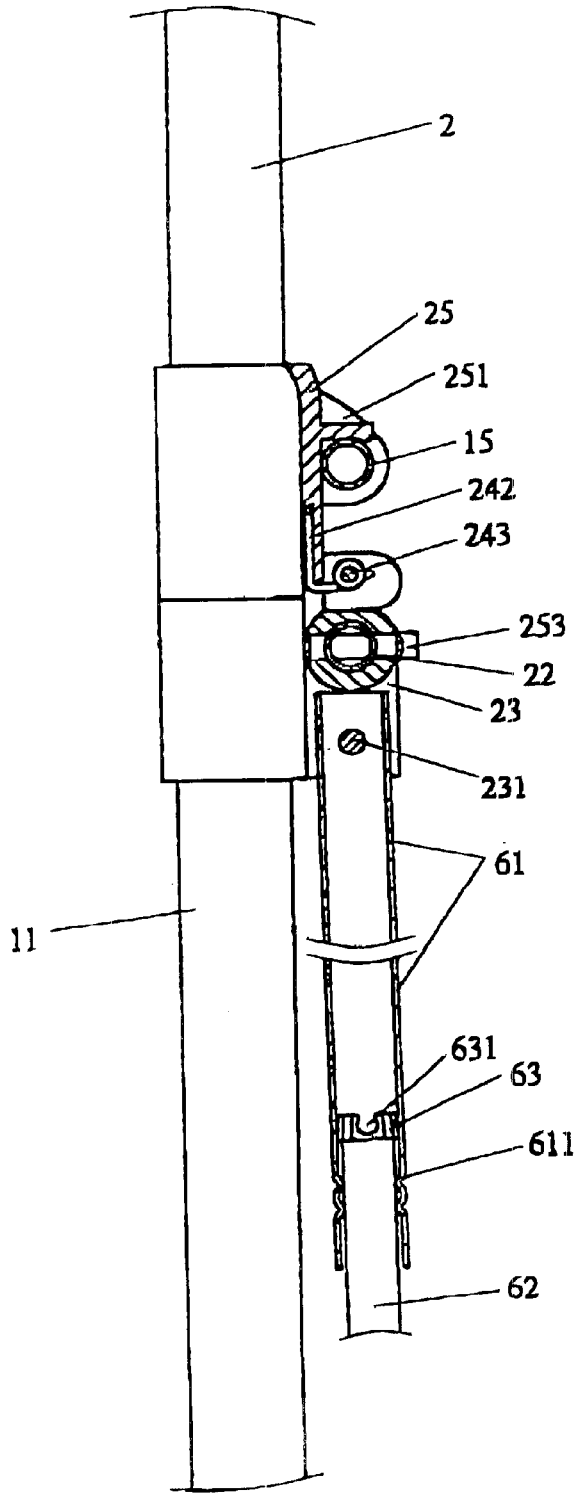
FIG. 3 is a *side* view [similar to] *of* FIG. 2 *when the push cart is* in operation.

The handle 2 is [a] reversed U-shaped *and* comprises two sliding seats 21, a cross bar 22, a lock 23, a torque spring 24 and a snap plate 25. The handle 2 is inserted at its two ends to the sockets 14 of the main frame 1 and secured with two sliding seats 21 which are also inserted through the U-shaped rod 11 so that the main frame 1 and the handle 2 are slidable against each other. The two sliding seats 21 are interconnected by a cross bar 22 which includes a lock 23 at center, as shown in FIGS. 2 and 3. The lock 23 includes a tube 235 in horizontal position [having] extending upwardly and downwardly, a pair of plate*s* from respective [ends, the] *ends. The* downward end plate of the tube 235 has a through hole (not marked) and is secured to the upper portion of an outer tube 61 of the retractable rod 6 by a fixed pin [231, the] *231. The* upper plates of the tube 235 [have] *are* formed with a stopper 232 and two holes 233 and [234, the] *234. The* torque spring 24 is formed with spiral coil and a pair of bars 241 extending from respective sides thereof and a reversed U-shaped snap ring 242 at center of the rod [241, the] *241. The* snap plate 25 has a slope surface 251 at its top portion and a recess 252 at the rear end [thereof, the] *thereof. The* snap plate 25 comprises a hole 254 at the respective lower sides, and a stopper 253 at the front [position, the] *position. The* torque *spring* 24 is connected to the lock 23 by inserting a pin 241 through the hole 233, and a pin 243 through hole 234 and the center of the torque spring [24, the] *24. The* snap plate 25 is buckled to the tube 235 of the lock 23 by the cross bar 22 with the snap ring 242 of the torque spring 24 seat in the recess 252 of the snap plate 25, whereas the stoppers 232 and 253 [will] block each other when the snap plate 25 is pushed rearwardly to a predetermined angle.

The front support 3 is *in* a plate form [having] *and has* a pair of hinges 31 extending upwardly from the respective [ends, each] *ends. Each* hinge 31 is formed by two horizontal plates 311 which are inserted by the lower end of the supporting rod 13 of the main frame 1 and secured by a pin 32 therein. Each hinge 31 has a plate 311 [having formed] with teeth 312, and the front support 3 has a rib 33 at its bottom portion for the convenience of operating the cart when fully loaded.

The wheel frame 4 [has] *is* connected to the wheel 5 and is connected to the lower end of the supporting rod [13, the] *13. The* wheel frame 4 has also teeth 41 corresponding to and [meshes] *meshing* with the teeth 312[, by the meshing of the teeth 312 and 41,] *such that* when the front support 3 is making horizontal or vertical movement, the wheel frame 4 can be turned left or right in a horizontal direction.

The retractable rod 6 includes an outer tube 61, an inner tube 62, a stopper 63 and a C-snap ring 64, whereas the inner tube 62 is slidably inserted in the outer tube 61 and [has] formed *with* a stopper 63 at the top [portion, the] *portion. The* stopper 63 has a larger outer diameter than the outer diameter of the inner tube 62 but smaller than the inner diameter of the outer tube [61, a] *61. A* C-shaped groove 631 is formed on the top of the stopper [63, and the] *63. The* outer tube 61 has an inwardly bulge portion 611 and [a] *the* C-snap ring 64 [at] *engaged with* the lower end *of the inner tube 62* which is connected to the center front portion of the front support 3.

The rear support 7 is a plate [having] connected with a locating bar 71 which center portion will be clipped by the C-snap ring 64, the respective sides of the rear support 7 are secured to the pin 121 of the fixture 12, and the pulling spring 16 has one end secured to the rear support 7, whereas the other end of the pulling spring 16 is secured to the supporting rod 13 which lower end is secured by the pin 32 so that a retract force is applied on the rear support 7.

Figure 4:
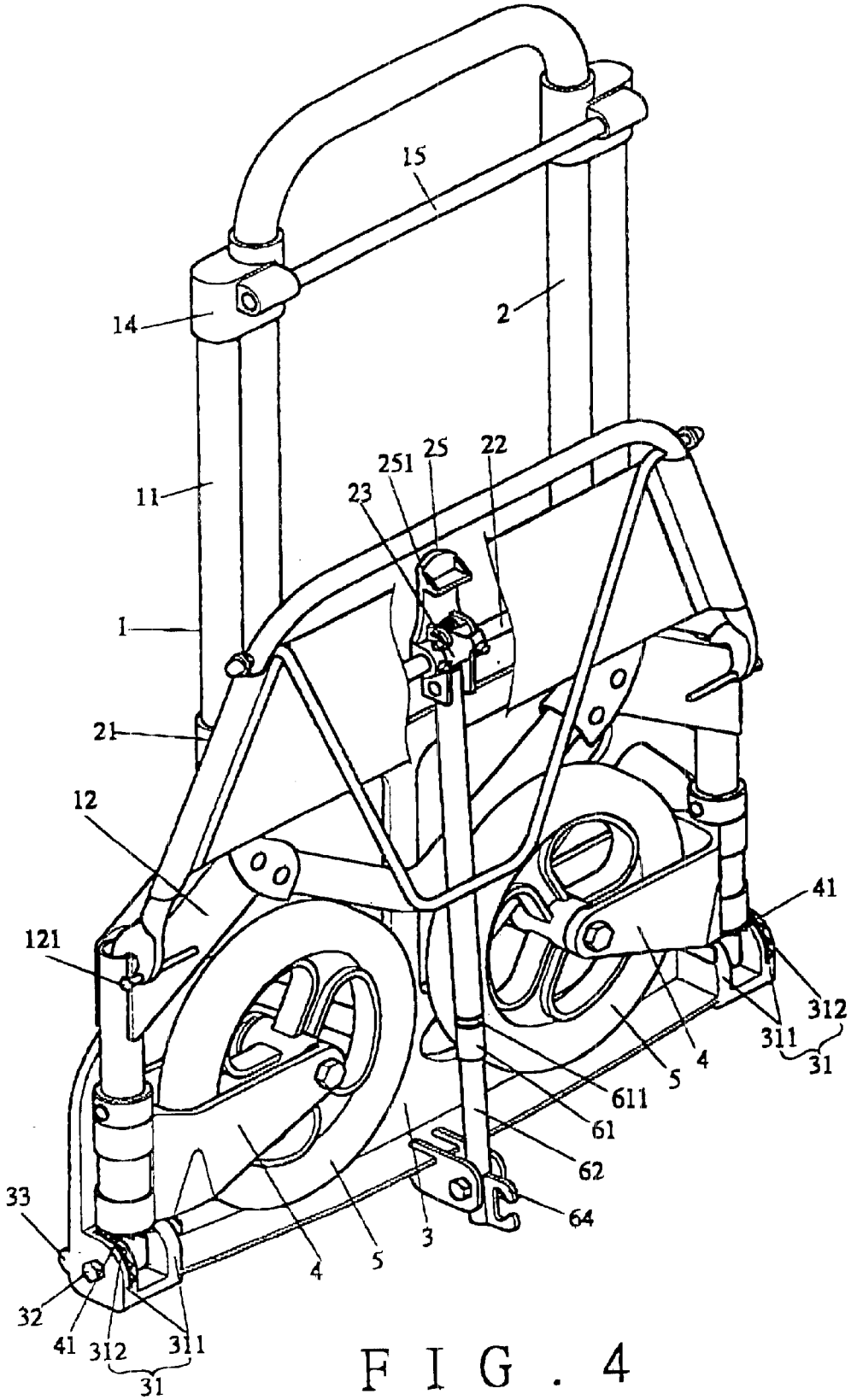
FIG. 4 is a *rear* perspective view of the present invention in a folded status.
Figure 5:
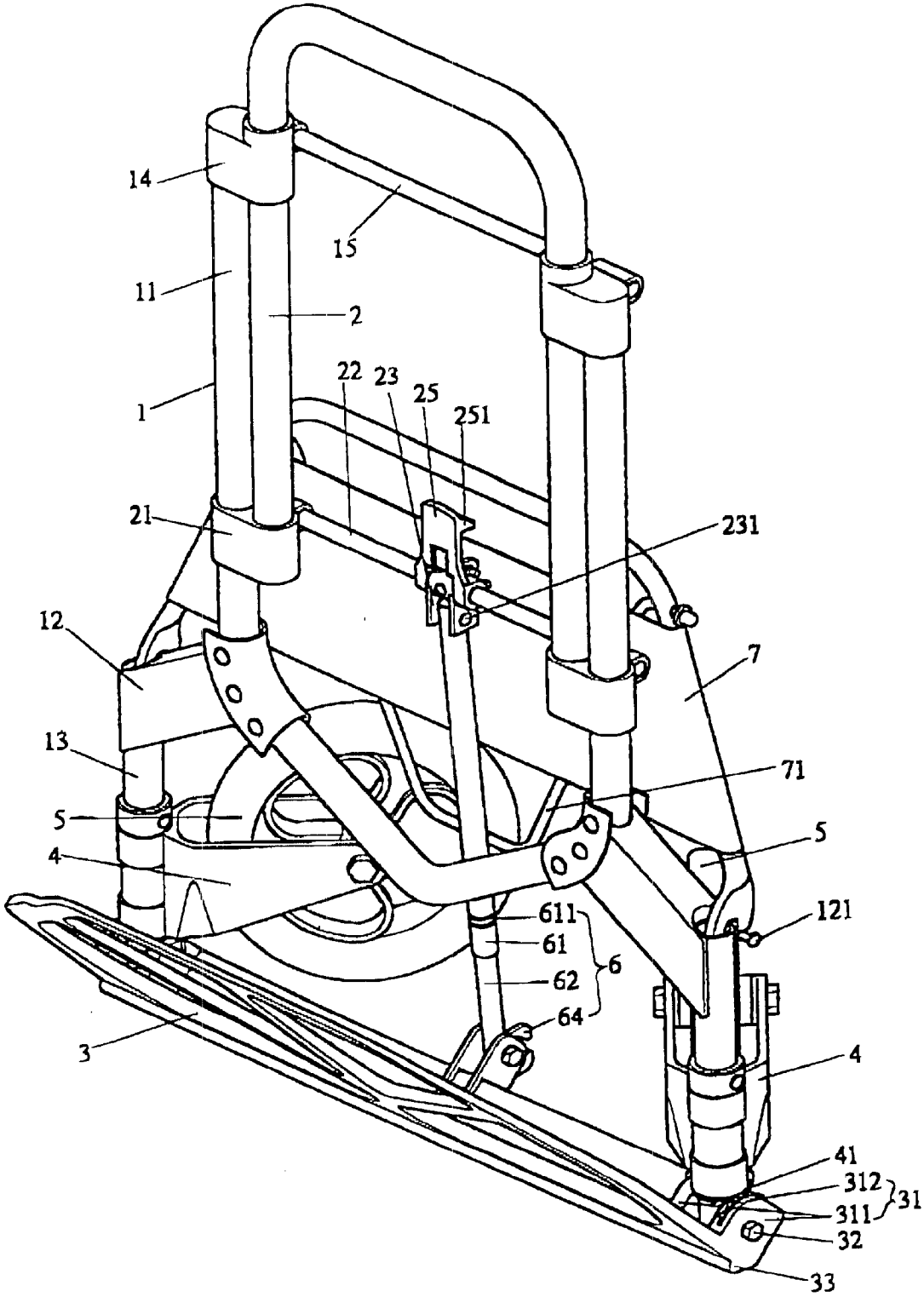
FIG. 5 is a perspective view similar to FIG. 4 with a support in opening status.

To operate the present invention, as shown in FIGS. 4 and 5, [push] the handle 2 *is pushed* towards the main frame 1 to [retract] *reduce* the [length, when] *length of the cart. When* when the [retracting] *pushing of the handle 2* has reached [a certain degree] *to a lowest position*, the outer tube 61 and the inner tube 62 [will retract simultaneously, upon] *substantially telescope with full length of each other. Upon* the groove 631 of the stopper 63 of the inner tube 62 [reaches] *interlocks with* the pin 231 of the lock 23, a further pushing force will activate the retractable rod 6 to link the front support 3 to turn, whereas the teeth 312 of the hinge 31 mesh with the teeth [41] *41,* that links the wheel frame 4 to retract and return into the main frame 1.

Figure 6:
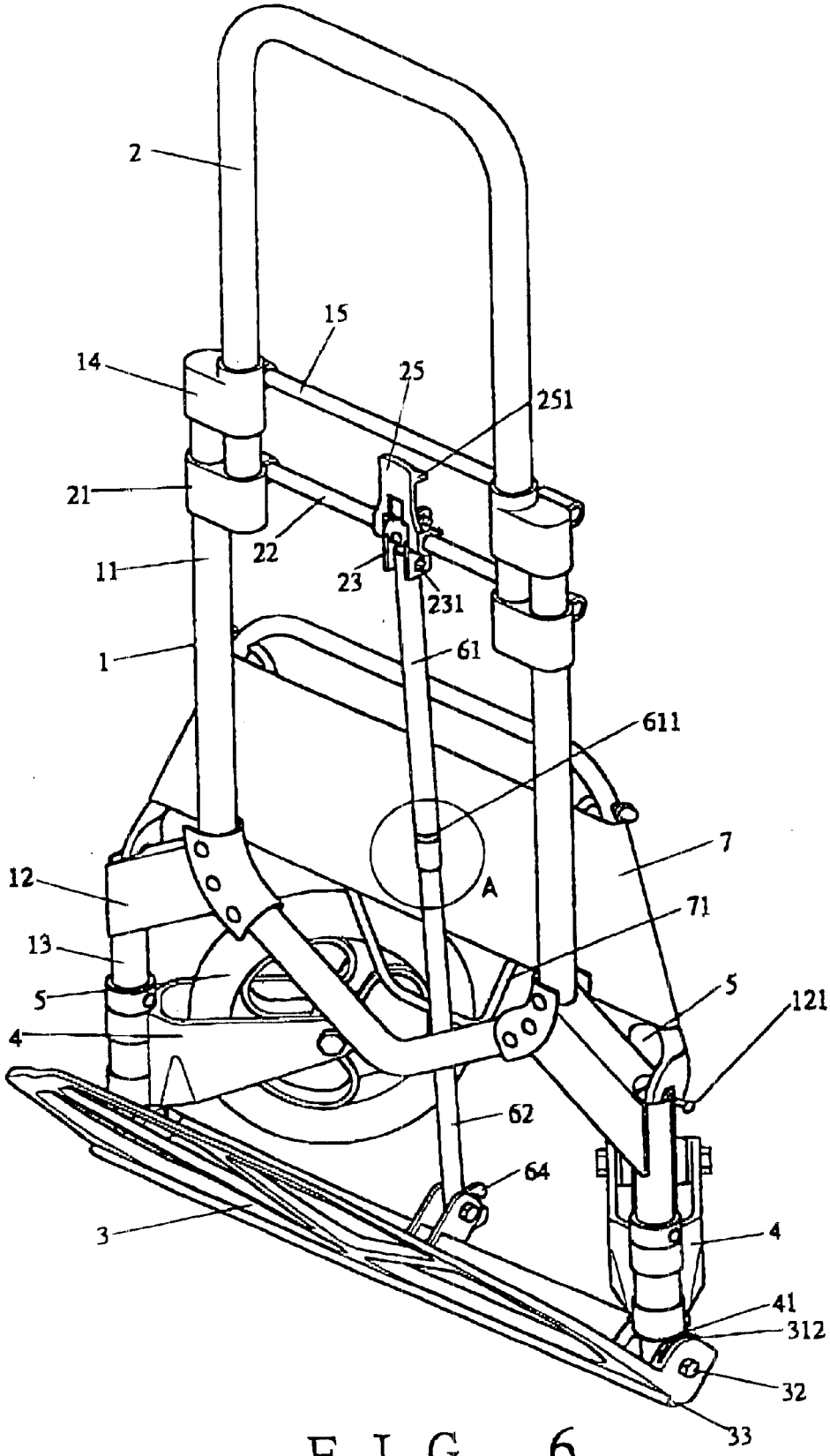
FIG. 6 is a perspective view of the present invention in partially operating status.
Figure 7:
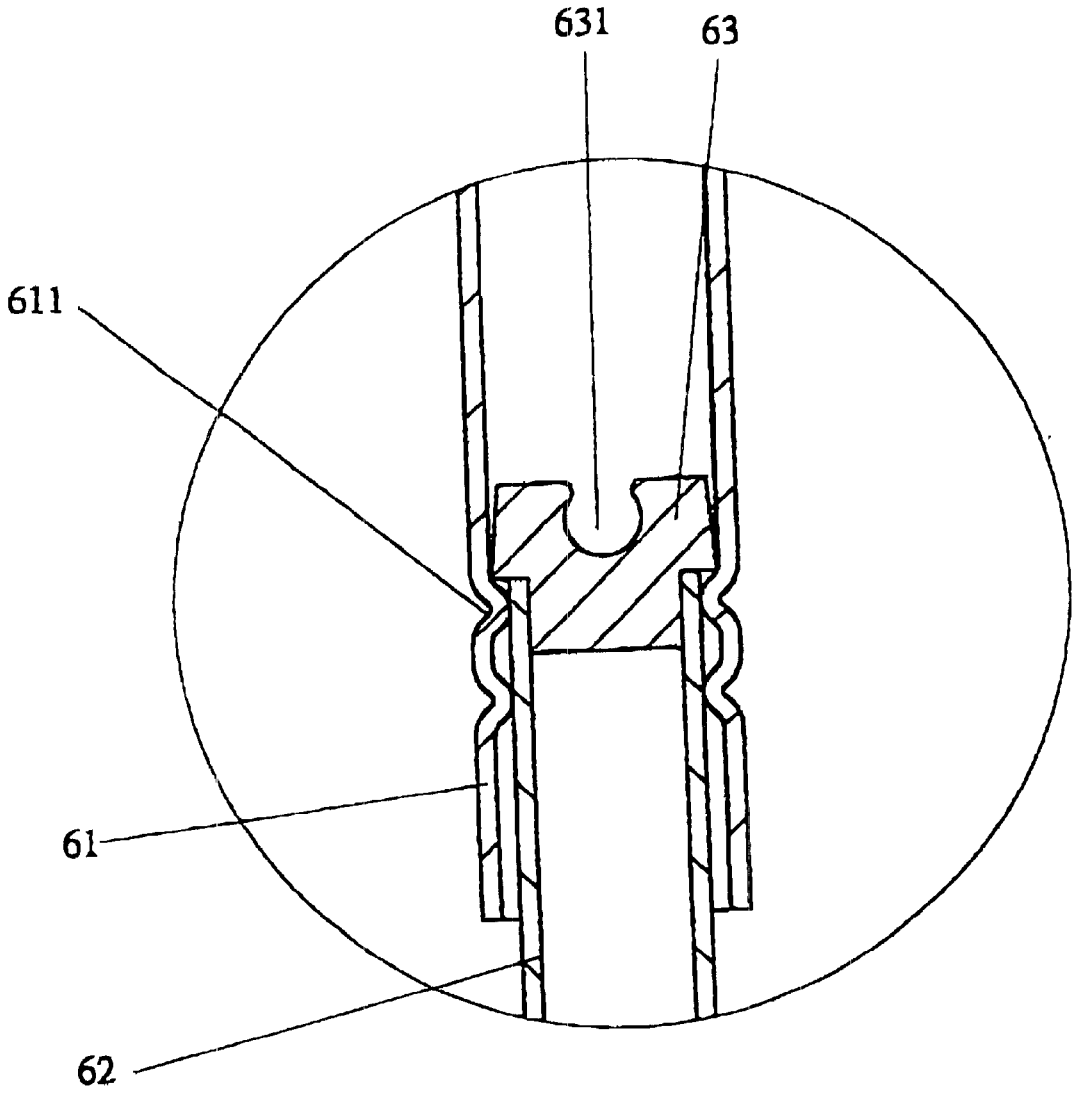
FIG. 7 is a is an enlarged view of circle A of FIG. 6.
Figure 8:
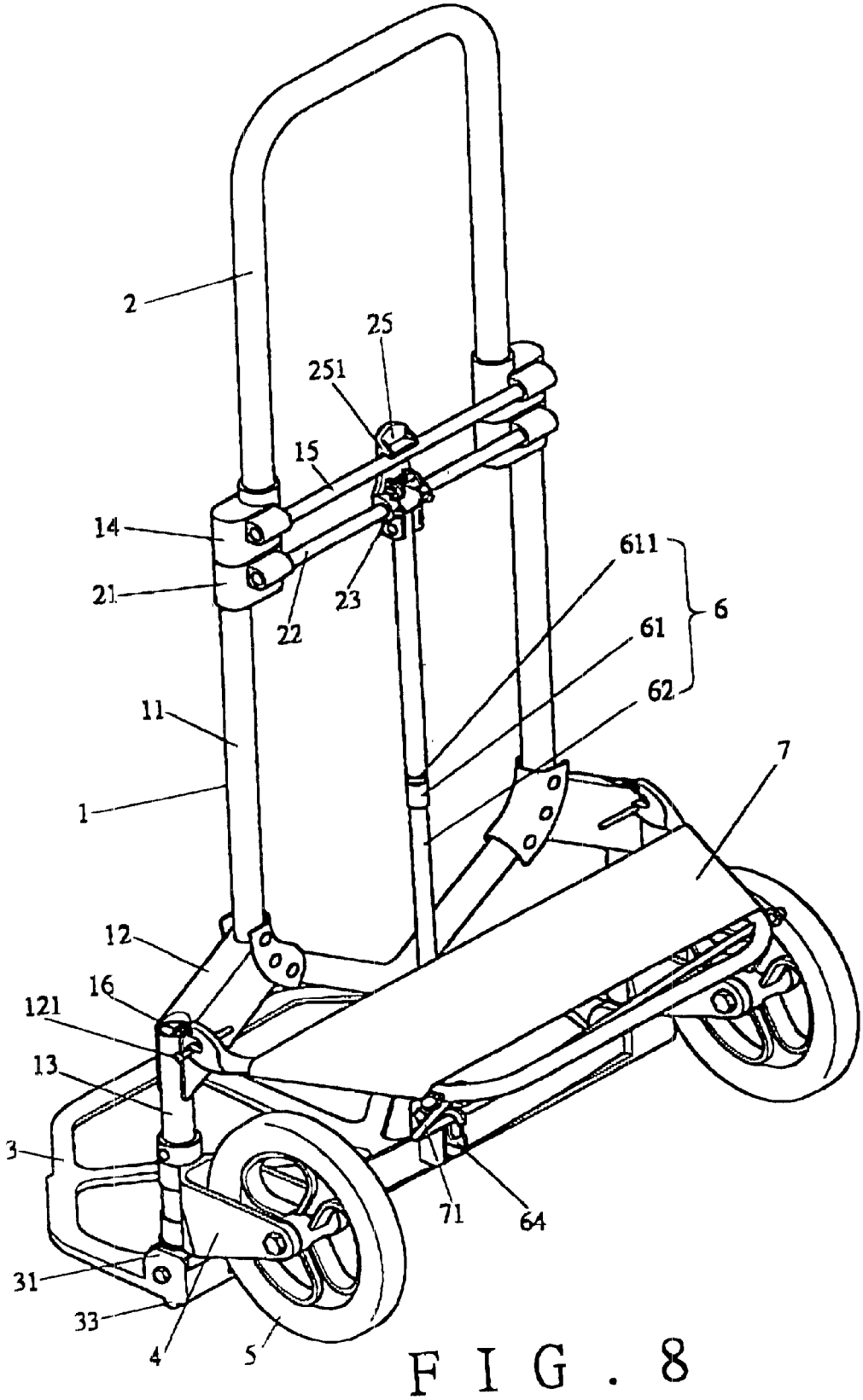
FIG. 8 is a rear perspective view of the present invention in an open status.
Figure 9:
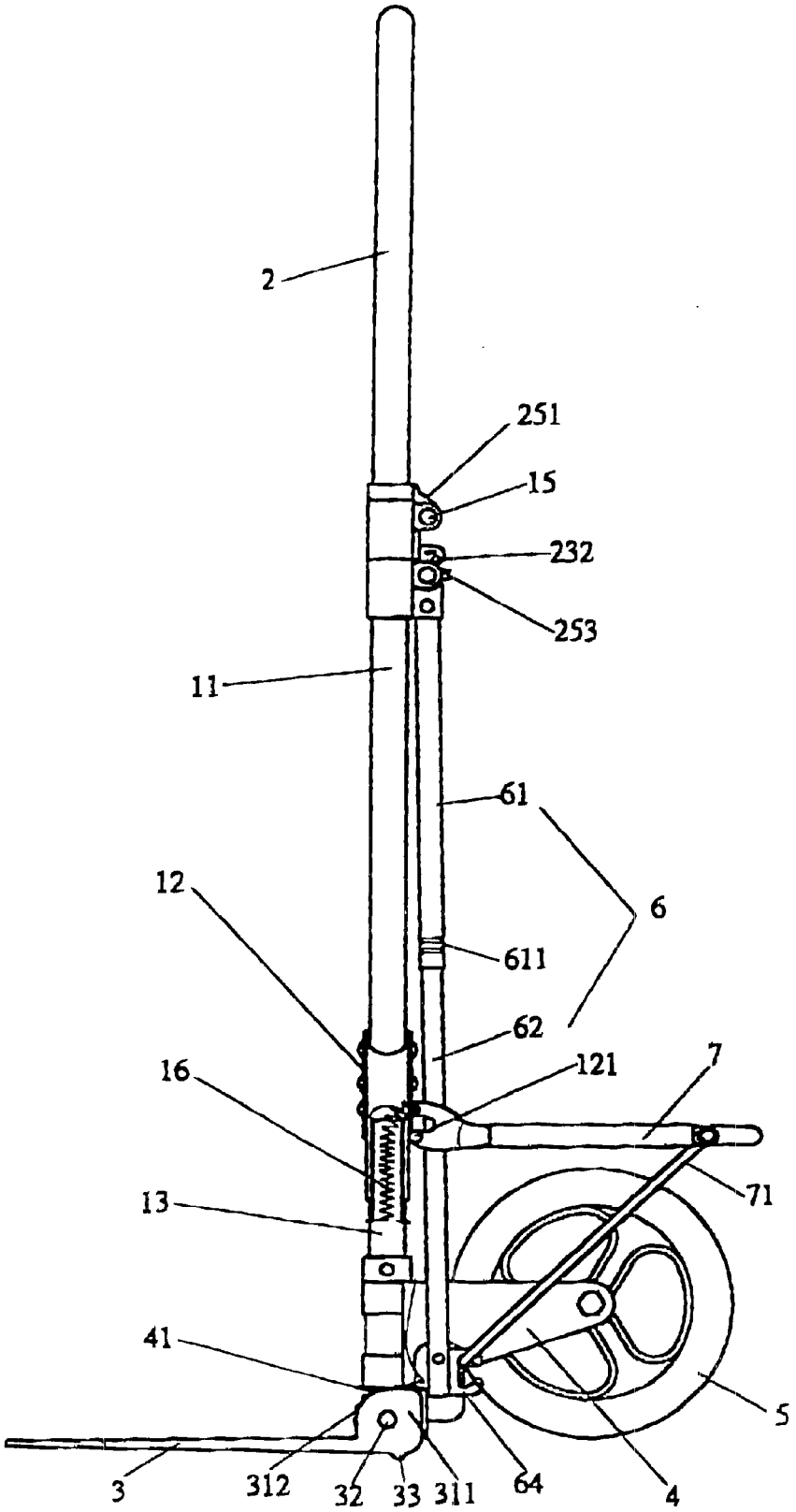
FIG. 9 is a side view of the present invention in an open status.

On the other hand, to expand the cart, by pulling the handle 2 outwardly, the retractable rod 6 will extend too, as shown in FIG. 6. When the outer tube 61 and the inner tube 62 have reached to their extremity, as shown in FIG. 7, the stopper 63 of the inner tube 62 will be stopped by the bulge portion [611,] *611. By applying* a continuous pulling *force on* the handle 2 at this moment, the retractable rod 6 will expand the front support 3 and the meshing of the teeth 312 and 41 will bring the wheel frame 4 to expand too, as shown in FIG. 1. Furthermore, the pulling force of the handle 2 with respect to the main frame [1,] *1 causes* the snap plate 25 of the lock 23 [will] *to* clip the cross bar 22 of the handle 2 [that] (*that* confines the handle 2 from [retraction. Still Furthermore] *retraction*). *Even more*, when the rear support 7 is in expand position, as shown in FIGS. 8 and 9, the respective ends pull the pulling spring 16, and the locating bar 71 will be clipped by the C-snap ring 64 of the retractable rod 6 which prevents the rear support 7 from returning to its retractable position.

*The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by one skilled in the art without departing from the spirit of the present invention. Accordingly, it is expressly intended that all such variations or changes which fall within the spirit and scope of the present invention as defined in the claims, be embraced thereby.*

I claim:

1. A push cart comprising a main frame, a handle, a front support, two wheel frames, two wheels, *and* a retractable rod [and a rear support], wherein said main frame having [the] respective sides connected to respective sides of said handle in a slidable manner, [the center portion of said main frame being connected to respective sides of said rear support, the] *a* lower portion[s] of said main frame being connected to said wheel frames which [then] *are* connected to said wheels[,] respectively[, the lower ends of said main frame being connected] *and* to respective sides of said front support, [Further,] the respective sides of said front support comprising teeth, and said wheel frame*s* having teeth corresponding to and meshing with said teeth of said front support, said handle having [its] respective ends connected to *one end of* said retractable rod, and the other end of said retractable rod being connected to [the] *an* inner center portion of said front support[, thus,] *such that* by operating said handle[, linking] *thereby engaging* said retractable rod [and] *with* said front support and said wheel frame*s* to move simultaneously.

2. The push cart as recited in claim 1, wherein said main frame comprising a U-shaped rod, two fixtures secured to [the respective] *a* lower [ends] *portion* of said U-shaped rod, two supporting rods connected to said fixtures[,] respectively, two sockets, *and* a cross bar [and two pulling springs, each said supporting rod having a torque spring which has one end secured to said supporting rod while the other end of said torque spring being secured to said rear support], each said fixture comprising *a* pin, and said sockets being connected to said U-shaped rod and having [a] *the* cross bar extending in between.

3. The push cart, as recited in claim 1, wherein said handle [shape like] *is shaped as* a reversed English letter U[, comprising] *and includes* two sliding seats, a cross bar, a lock, a torque spring, and a snap plate, wherein [two] *respective* ends of said handle are inserted into *respective* sockets *of said main frame* and secured with said sliding seats [of said main frame] respectively, said sliding seats are inserted through respective ends of said U-shaped rod, [a] *said* cross bar [being] *is* set between said sliding seats, and [a] *the* lock [being] *is* set on said cross bar[, said lock being] *and* connected to said torque spring and said snap plate[, said snap plate having a slope surface].

4. The push cart, as recited in claim [1] *3*, wherein said lock [having] *has* a stopper at *a* top end *thereof,* and said snap plate [having a] *has at least one* stopper at [its] *a* lower left [and] *or* right position[s, respectively] *thereof.*

5. The push cart, as recited in claim 1, wherein said front support [having] *has* a *pair of* hinge*s* extending from *the* respective [ends] *sides thereof,* and each hinge hinges [the] *said front support to one* lower end[s] of each [said] *of two* supporting rod*s of the main frame*, and each hinge [having] *has* teeth[,] *meshing with corresponding teeth of* said wheel [frame hinged to the lower end of said supporting rod, and said wheel frame corresponding to said teeth of said rear support having formed with teeth for meshing together] *frames.*

6. The push cart, as recited in claim 1, wherein said retractable rod [comprising] *comprises* an outer tube, an inner tube, a stopper and a C-snap ring, [whereas] said inner tube [being] *is* sleeved on said outer tube in an sliding manner, [and] said inner tube [having] *has* a stopper at [its] *a* top end [which comprises] *thereof, the stopper has* an outer diameter slightly larger than [the] *an* outer diameter of said inner tube and smaller than [the] *an* inner diameter of said outer tube, said stopper [comprising] *comprises* a C-shaped groove at [its] *a* top end *thereof,* and said outer tube [having] *has* an inner bulge portion[, said outer tube having a] *and the* C-snap [rig] *ring* at [the] *a* lower end [and the lower end of said outer tube being connected to the center portion of said rear support] *thereof.*

*7. The push cart, as recited in claim 6, further comprising a rear support, wherein the lower portion of said main frame being connected to respective sides of said rear support, and a lower end of said inner tube is connected to the inner center portion of said front support.*

*8. The push cart, as recited in claim 2, further comprising a rear support, wherein the center portion of said main frame being connected to respective sides of said rear support.*

*9. The push cart as recited in claim 8, wherein said main frame further comprises two supporting rods, and each said supporting rods having a pulling spring which has one end secured to said supporting rod while the other end of said pulling spring being secured to said rear support.*

*10. The push cart as recited in claim 1, wherein a length of the retractable rod substantially varies in order to retract the front support and the wheels to the main frame.*

*11. The push cart as recited in claim 10, wherein the retractable rod includes tubes telescopingly engaged to vary the length of the retractable rod.*

*12. The push cart as recited in claim 1, wherein the wheels are retracted by rotating about the main frame.*

*13. A push cart comprising a handle, a main frame, a front support, two wheels, and a retracting means, wherein the main frame has a left side and a right side being connected to respective sides of the handle in a slidable manner, and a lower portion being connected to the front support and one side of each of the wheels such that the retracting means retracts the front support and the two wheels to the main frame simultaneously, and a length of the retracting means substantially varies in order to retract the front support and the two wheels to the main frame.*

*14. The push cart according to claim 13, wherein the retracting means is connected to a upper portion of the main frame and an inner center portion of the front support so as to retract the front support and the wheels simultaneously.*

*15. The push cart according to claim 14, wherein each of the wheels has a gear, and a right side and a left side of the front support each has at least one gear to mesh with the gear of each of the wheels respectively.*

*16. The push cart according to claim 13, wherein the retracting means is shaped as a rod.*

*17. The push cart according to claim 13, wherein said connection between at least two of the main frame, the front support, the wheels, and the retracting means is provided by at least one pair of meshing gears.*

*18. The push cart according to claim 13, wherein said main frame includes a U-shaped rod, two fixtures secured to a lower portion of said U-shaped rod, two supporting rods connected to said fixtures respectively, two sockets, and a cross bar, each said fixture comprising a pin, and said sockets being connected to said U-shaped rod and having a cross bar extending in between.*

*19. The push cart according to claim 13, wherein said handle has two ends connected to one end of said retracting means, and the other end of said retractable means is connected to an inner center portion of said front support such that said retractable means, said front support and said wheels are linked to move simultaneously by operating said handle.*

*20. The push cart according to claim 13, wherein said handle is shaped like a reversed English letter U and has two sliding seats, and two ends of said handle are respectively inserted into two respective sockets of said main frame so as to be secured with the two sliding seats of the handle.*

*21. The push cart according to claim 13, wherein said handle further has two sliding seats, a cross bar, a lock, a torque spring, and a snap plate, said sliding seats are inserted through respective ends of said U-shaped rod, said cross bar is set between said sliding seats, and said lock is set on said cross bar and connected to said torque spring and said snap plate.*

*22. The push cart according to claim 21, wherein said lock having a stopper at a top end thereof, and said snap plate having at least one stopper at a lower left or right position thereof.*

*23. The push cart according to claim 13, further comprising two wheel frames for connecting the wheels to the main frame, wherein said front support has a pair of hinges extending from respective sides thereof, and each hinge hinges said front support to one lower end of each of two supporting rods of the main frame, and each hinge has teeth meshing with corresponding teeth of each of said wheel frames.*

*24. The push cart according to claim 13, wherein said retracting means comprises an outer tube, an inner tube, a stopper and a C-snap ring, wherein said inner tube being sleeved on said outer tube in a sliding manner, and said inner tube having a stopper at a top end thereof, the stopper has an outer diameter slightly larger than the outer diameter of said inner tube and smaller than the inner diameter of said outer tube, said stopper comprising a C-shaped groove at a top end thereof and said outer tube having an inner bulge portion and a C-snap ring at a lower end thereof.*

*25. The push cart, as recited in claim 24, further comprises a rear support, wherein the lower portion of said main frame is connected to respective sides of said rear support, and a lower end of said inner tube is connected to an inner center portion of said front support.*

*26. The push cart, as recited in claim 13, further comprising a rear support, wherein the right and left sides of said main frame are connected to respective sides of said rear support.*

*27. The push cart as recited in claim 26, wherein said main frame further comprises two supporting rods, and each of said supporting rods has a pulling spring which has one end secured to said supporting rod while the other end of said pulling spring being secured to said rear support.*

*28. The push cart as recited in claim 13, wherein the retracting means includes tubes telescopingly engaged to vary the length of the retracting means.*

*29. The push cart as recited in claim 13, wherein the wheels are retracted by rotating about the main frame.*

* * * * *